G. W. Hyatt,
Animal Shackle.

Nº 66,846.          Patented July 16, 1867.

Witnesses.
A. Babbett
S. Red

Inventor.
G. W. Hyatt

United States Patent Office.

GEORGE W. HYATT, OF AUBURN, NEW YORK.

Letters Patent No. 66,846, dated July 16, 1867.

IMPROVED HOPPLES.

The Schedule referred to in these Letters Patent and making part of the same.

TO WHOM IT MAY CONCERN:

Be it known that I, G. W. HYATT, of the city of Auburn, in Cayuga county, State of New York, have invented a new and improved Mode of Constructing Hopples, hereinafter described; and I do hereby declare the following to be a full, clear, and exact description of the same, reference being had to the accompanying drawings, making a part of this specification, and to the letters of reference marked thereon.

Hopples, in all cases of which I have any knowledge, are fastened to the animal by means of either spring catches or tied thereto with cords, for the purpose of making them fast. Now, the object of this invention is to construct or improve the hopple as to not require either of the above appliances, in order to affix them securely on the animal at much less expense, and be less liable to get out of repair than those now in use.

And in order that others may know how to make and use my invention, I will proceed to describe its construction and mode of operation.

A is the bow of the hopple, jointed at B, to allow it to open and close around the limb of the animal. C is the hook, and D the hasp. E is a bended link; F, a swivel-joint.

Figure 2:
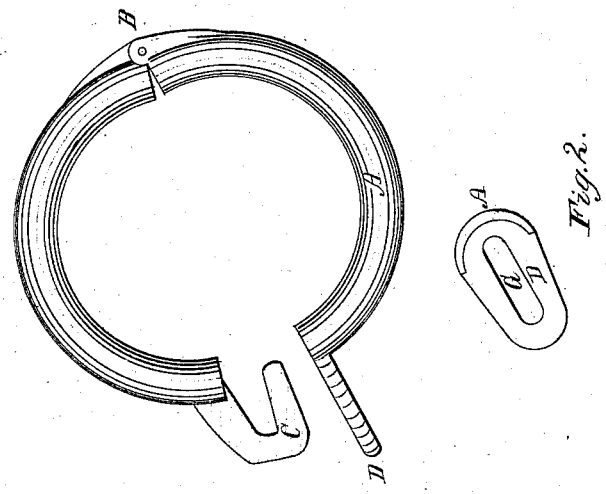
Figure 2 is a plan of the same, showing the improved portions more in detail.
Figure 1:
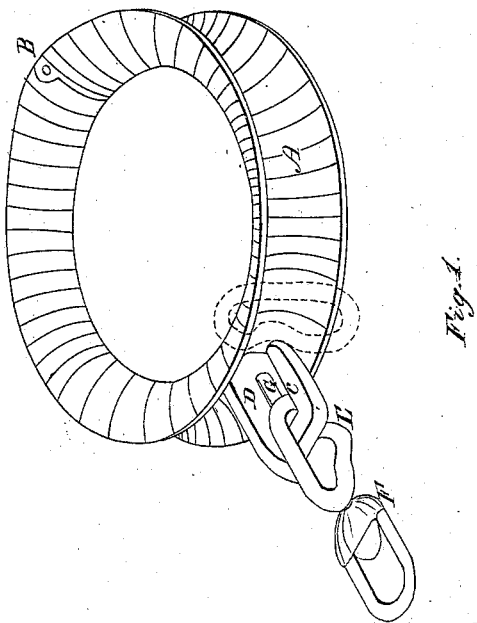
Figure 1 represents the hopple complete, with all the parts in their relative places to each other.

In placing the bow on the animal's limb, it is opened sufficiently to allow the limb to pass between the hook and hasp, and then the hook C is passed through the slot G in the hasp, and the bended side of the link is placed in a vertical position to the bow with the bended side, as represented in fig. 1 in red lines, and slipped towards the hasp, and past the end of the hook, and then brought into the position as shown in fig. 1. This link secures the bow in its normal condition, and it cannot be opened except in just the reverse operation above described. The chance of this is so remote that it is found on trial in a great number of cases to be one of the most complete adaptations of means to an end that could be desired.

Having above described the construction and mode of operating my invention, what I claim as new, and wish to secure by Letters Patent, is—

1. The combination of the bow A, hook C, and hasp D, when all are arranged and operated substantially in the manner and for the purpose above set forth.

2. The combination of the swivel-joint F with the link E, having one of its sides bended, as and for the purpose substantially as above specified.

GEO. W. HYATT.

Witnesses:
A. BABBETT,
H. REED.